US008636612B2

(12) United States Patent  
Westley

(10) Patent No.: US 8,636,612 B2  
(45) Date of Patent: Jan. 28, 2014

(54) CENTER ADAPTER ASSEMBLY

(75) Inventor: Curtis E. Westley, Phoenix, AZ (US)

(73) Assignee: Remy Technologies, L.L.C., Pendleton, IN (US)

( * ) Notice: Subject to any disclaimer, the term of this patent is extended or adjusted under 35 U.S.C. 154(b) by 23 days.

(21) Appl. No.: 13/369,066

(22) Filed: Feb. 8, 2012

(65) Prior Publication Data

US 2013/0203540 A1    Aug. 8, 2013

(51) Int. Cl.
*F16H 3/72* (2006.01)

(52) U.S. Cl.
USPC .............................................................. 475/5

(58) Field of Classification Search
USPC ............................................ 475/5; 180/65.6
See application file for complete search history.

(56) References Cited

U.S. PATENT DOCUMENTS

| 1,661,780 | A | * | 3/1928 | Warhus ........................ 180/65.6 |
| 2,578,837 | A | * | 12/1951 | Raney ........................... 310/112 |
| 4,260,919 | A | * | 4/1981 | Fleming ........................ 310/113 |
| 4,729,258 | A | * | 3/1988 | Mohri et al. ....................... 475/5 |
| 5,289,890 | A | * | 3/1994 | Toyoda et al. ............... 180/65.8 |
| 5,289,891 | A | * | 3/1994 | Sugiyama ..................... 180/412 |
| 5,372,213 | A | * | 12/1994 | Hasebe et al. ............... 180/65.6 |
| 5,396,968 | A | * | 3/1995 | Hasebe et al. ............... 180/65.6 |
| 6,196,813 | B1 |  | 3/2001 | Turley et al. |
| 6,276,474 | B1 | * | 8/2001 | Ruppert et al. .............. 180/65.6 |
| 6,349,782 | B1 | * | 2/2002 | Sekiya et al. ............... 180/65.25 |
| 6,935,986 | B2 |  | 8/2005 | Hvolka et al. |
| 7,112,905 | B2 |  | 9/2006 | Chang et al. |
| 7,350,606 | B2 |  | 4/2008 | Brill et al. |
| 7,537,536 | B2 |  | 5/2009 | Hvolka et al. |
| 7,960,883 | B2 |  | 6/2011 | Hishida et al. |
| 8,397,502 | B2 | * | 3/2013 | Barker ............................ 60/608 |
| 2001/0017227 | A1 | * | 8/2001 | Amano et al. ............... 180/65.2 |
| 2008/0272662 | A1 |  | 11/2008 | Cavagna et al. |
| 2009/0152030 | A1 |  | 6/2009 | Palatov |
| 2010/0133023 | A1 |  | 6/2010 | Tang |
| 2010/0187929 | A1 |  | 7/2010 | Hishida et al. |

FOREIGN PATENT DOCUMENTS

| JP | 2002-065795 | 3/2002 |
| JP | 2006-251133 | 9/2006 |
| JP | 2008-008470 | 1/2008 |
| JP | 2010-023655 | 2/2010 |
| KR | 20-0457901 | 1/2012 |

OTHER PUBLICATIONS

PCT/US2013/024323, International Search Report; May 14, 2013.
PCT/US2013/024323, Written Opinion, May 14, 2013.

* cited by examiner

*Primary Examiner* — Dirk Wright

(74) *Attorney, Agent, or Firm* — Cantor Colburn LLP

(57) ABSTRACT

An adapter assembly is provided and includes a body having a first periphery, a second periphery opposite the first periphery and a central region interposed between the first and second peripheries. The first periphery is attachable to a first housing at a first aperture thereof, the first housing defining an interior in which a first motor is disposable. The second periphery is attachable to a second housing at a second aperture thereof, the second housing defining an interior in which a second motor is disposable. The central region is configured to encase a coupling for operably coupling the first and second motors via the first and second apertures, respectively, for output to a shaft.

18 Claims, 2 Drawing Sheets

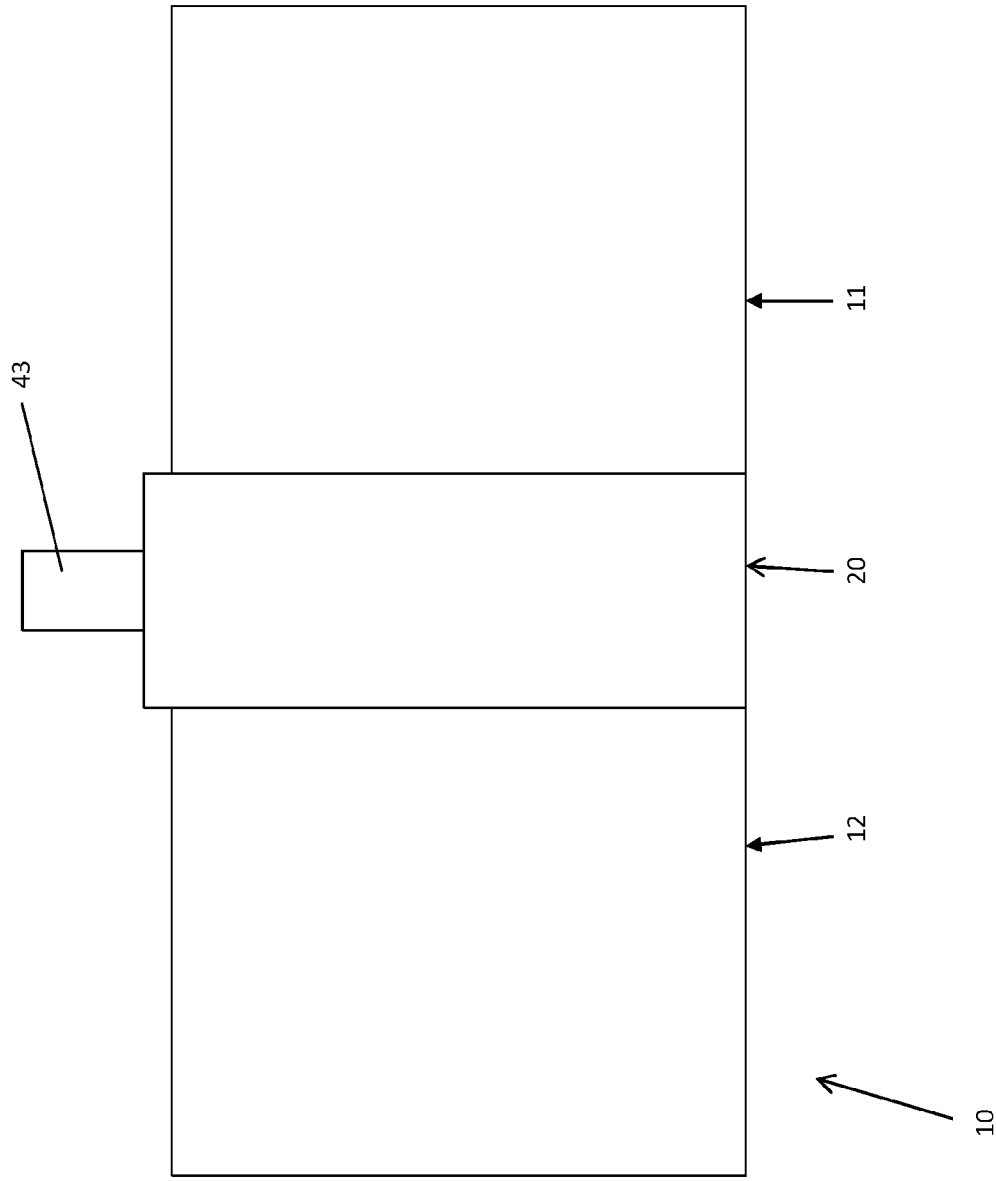

CENTER ADAPTER ASSEMBLY

BACKGROUND OF THE INVENTION

The present disclosure relates to an adapter assembly and, more particularly, to a center adapter assembly to couple two electric drive motors.

Drive trains, such as those provided for hybrid or electric vehicles, often require that two or more electric drive motors be coupled to one another so that their combined torque can be delivered to an output shaft. Generally, each of these dual motors is housed in a separate housing from which a separate drive shaft extends. The coupling is then provided as a separate hardware element by which the torque applied to one of those drive shafts is transmitted from the one drive shaft to the other via the coupling. This hardware is often complex, costly and difficult to manufacture and service.

BRIEF DESCRIPTION OF THE INVENTION

An adapter assembly is provided and includes a body having a first periphery, a second periphery opposite the first periphery and a central region interposed between the first and second peripheries. The first periphery is attachable to a first housing at a first aperture thereof, the first housing defining an interior in which a first motor is disposable. The second periphery is attachable to a second housing at a second aperture thereof, the second housing defining an interior in which a second motor is disposable. The central region is configured to encase a coupling for operably coupling the first and second motors via the first and second apertures, respectively, for output to a shaft.

An adapter assembly system is provided and includes first and second housings, each having an aperture and each being formed to define an interior in which a motor is disposable, a body having a first periphery, a second periphery opposite the first periphery and a central region interposed between the first and second peripheries. The first periphery is attachable to the first housing at the aperture thereof, the second periphery is attachable to the second housing at the aperture thereof, and the central region is configured to encase a coupling for operably coupling the first and second motors via the first and second apertures, respectively, for output to a shaft.

A method of assembling an adapter assembly is provided. The method includes disposing first and second motors in first and second housings, forming a body having a first periphery, a second periphery opposite the first periphery and a central region interposed between the first and second peripheries, attaching the first and second housings to the first and second peripheries, respectively, and configuring the central region to encase a coupling for operably coupling the first and second motors for output to a shaft.

BRIEF DESCRIPTION OF THE DRAWING

The following description should not be considered limiting in any way. With reference to the accompanying drawing, like elements are numbered alike:

FIG. 2 is a side sectional view of an adapter assembly system in accordance with further embodiments of the invention.

DETAILED DESCRIPTION OF THE INVENTION

Figure 1:
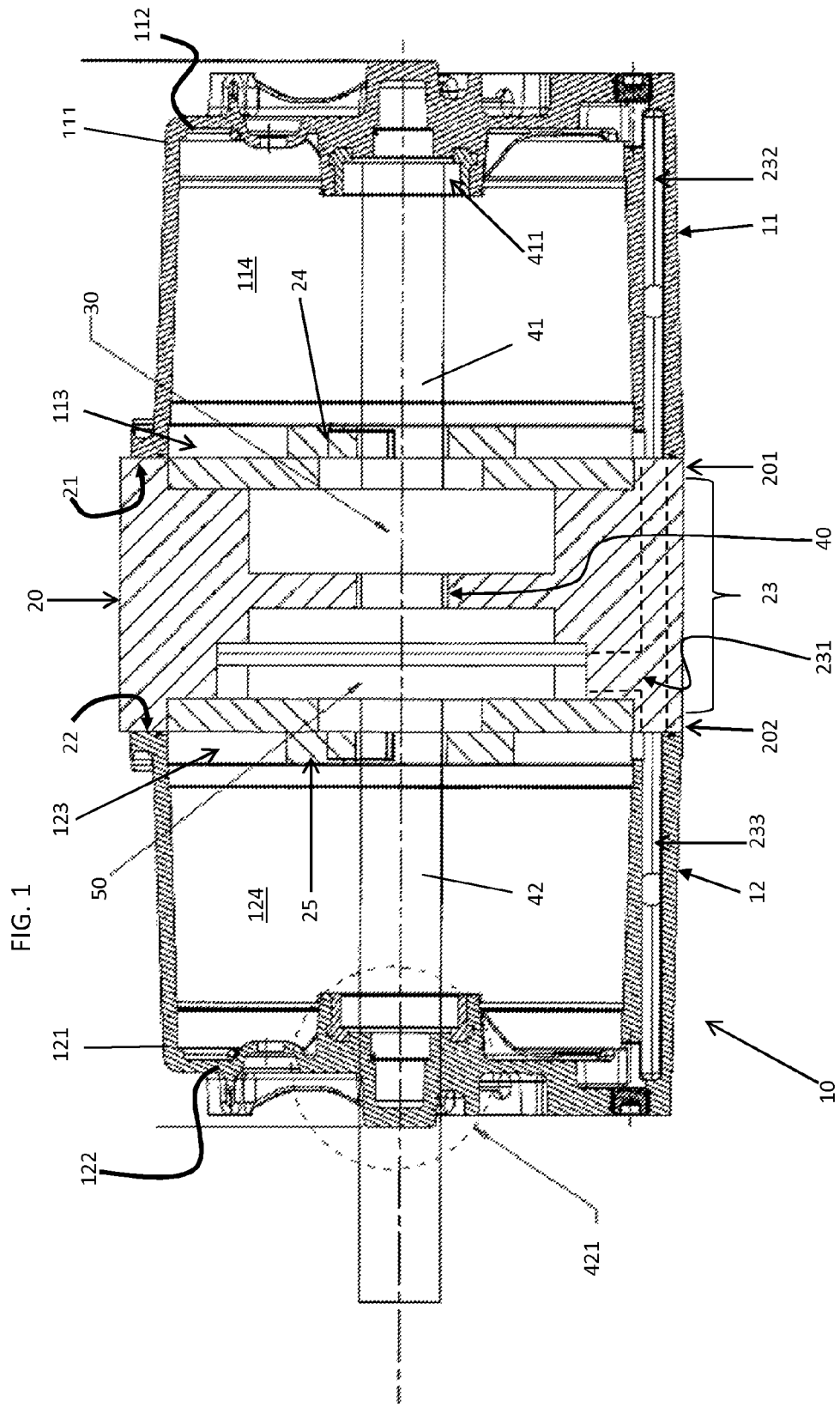
FIG. 1 is a side sectional view of an adapter assembly system in accordance with embodiments of the invention.

A detailed description of one or more embodiments of the disclosed assembly and method are presented herein by way of exemplification and not limitation with reference to FIGS. 1 and 2.

With reference to FIGS. 1 and 2, an adapter assembly system 10 is provided so that two or more electric drive motors (hereinafter "motors") can be coupled to one another so that their combined output torque can be applied to a drive shaft. The system 10 includes a first housing 11, a second housing 12 and a body 20. The first housing 11 has a generally annular body 111 and an end plate 112 to enclose one side of the generally annular body 111. The other side is open and forms a first aperture 113. The generally annular body 111 and the end plate 112 are formed to define a first interior 114 in which a first motor may be disposed. The second housing 12 is similarly constructed and has a generally annular body 121 and an end plate 122 to enclose one side of the generally annular body 121. The other side is open and forms a second aperture 123. The generally annular body 121 and the end plate 122 are formed to define a second interior 124 in which a second motor may be disposed.

The body 20 has a first peripheral section 21, a second peripheral section 22 opposite the first peripheral section 21 and a central region 23, which is interposed between the first and second peripheral sections 21 and 22. The first peripheral section 21 is attachable to the first housing 11 at the first aperture 113 and the second peripheral section is attachable to the second housing 12 at the second aperture 123. The central region 23 is configured to encase a coupling 30. The coupling 30 operably couples the first and second motors via the first and second apertures 113 and 123, respectively. This allows the torque generated by each of the first and second motors to be output as combined torque to shaft 40.

The body 20 is a solid, rigid element that may be formed by machining, casting or another suitable process and may have opposite sides 201, 202. The first peripheral section 21 may be defined on one of the opposite sides (i.e., side 201) as a substantially planar surface that can be mated with a complementarily planar surface of the first housing 11. The second peripheral section 22 may be defined on the other side of the body 20 (i.e., side 202) as a substantially planar surface that can be mated with a complementarily planar surface of the second housing 12. In accordance with embodiments, fastening elements, such as screws, may be employed to attach the first and second peripheral sections 21 and 22 with the first and second housings 11 and 12, respectively.

The forming process used to form the body 20 may be customized to define the central region 23 as an encasement of the coupling 30. In this way, the coupling 30 may be relatively tightly secured within the central region 23. Also, the stiffness and rigidity of the body 20 is maintained as an excess of material need not be removed and fluid leakage into the central region 23 is limited.

Although not required, the central region 23 may be further defined as an encasement of a gear pump 50. The gear pump 50 may be operably disposed on the shaft 40 such that rotation of the shaft 40 drives operation of the gear pump 50. In particular, the operation of the gear pump 50 serves to pump fluid, such as oil or another similar lubricant, from an external source to an interior of the system 10. In some cases, the central region 23 may be formed to define an oil sump 231, which is fluidly coupled to the gear pump 50 and to oil collection regions 232 and 233 in the first and second housings 11 and 12. With this arrangement, oil can be pumped into and out of the first and second housings 11 and 12 via the oil sump 231 during operations of the first and second motors. Seals 24 and 25 may also be provided at the sides 201, 202 of the body 20 to seal the first and second interiors 114 and 124 as well as the central region 23. In addition to the central region 23 being further defined as an encasement of a gear pump 50, it is to be understood that the central region 23 can also being defined as an encasement for electrical pumps, valves and any other feature necessary for engagement and interfacing with either of the first or the second motor.

In accordance with embodiments, the shaft 40 may be provided as a single shaft element or as multiple shaft elements including a first shaft 41 associated with the first motor and a second shaft 42 associated with the second motor. In the latter case, the coupling 30 may include a planetary gear-set with the first motor transmitting torque to the first shaft 41, which is rotatably supported in a bearing 411 of the first housing 11. The first shaft 41 is coupled to the planetary gear set, which is configured to gear up or gear down the rotation of the second shaft 42, which is rotatably supported in a bore 421 defined through the second housing 12 such that the second shaft 42 extends to an exterior of the second housing 12 and the system 10.

In accordance with alternative embodiments, the coupling 30 may include a planetary gear-set that is configured to gear up or gear down the rotation of the first shaft 41 and to be relatively easily replaceable if necessary. For example, in one use, the system 10 may be required to couple a first motor with a second motor where the first motor delivers twice the torque as the second motor. Meanwhile, in another use, the system 10 may be required to couple a first motor with a second motor where the first motor delivers five times the torque as the second motor. In the former use, an initial coupling 30 may be configured to gear down the rotation of the first motor by a ratio of 1:2. In the latter use, the initial coupling 30 is replaced with a secondary coupling 30 that is capable of gearing down the rotation of the first motor by a ratio of 1:5. This replacement can be accomplished by detaching the first housing 11 from the body 20, removing the initial coupling 30 from the central region 23 and replacing the initial coupling 30 with the secondary coupling 30 by installing the secondary coupling 30 into the now vacated central region 23. The first housing 11 is then reattached to the body 20.

In accordance with alternative embodiments, the coupling 30 may include differential gearing that is configured to combine and/or gear up or gear down the rotation of the first shaft 41 and the second shaft 42 to a third shaft 43 (see FIG. 2). The third shaft 43 may extend to an exterior of the system 10 and may be transversely oriented relative to the first shaft 41 and the second shaft 42 by way of bevel gearing for example. In this case, the coupling 30 is relatively easily replaceable, if necessary. For example, in one use, the system 10 may be required to couple a first motor with a second motor to deliver four times the torque to the third shaft 43. Meanwhile, in another use, the system 10 may be required to couple a first motor with a second motor to deliver six times the torque to the third shaft 43. In the former use, an initial coupling 30 may be configured to gear down the rotation of each motor by a ratio of 1:2. In the latter use, the initial coupling 30 is replaced with a secondary coupling 30 that is capable of gearing down the rotation of each motor by a ratio of 1.3. This replacement can be accomplished by detaching the first housing 11 from the body 20, removing the initial coupling 30 form the central region 23 and replacing the initial coupling 30 with the secondary coupling 30 by installing the secondary coupling 30 into the now vacated central region 23. The first housing 11 is then reattached to the body 20.

In accordance with further aspects, a method of assembling an adapter assembly is provided. The method includes selecting the first and second motors from a plurality of motors, at least some of which have different torque specifications from the others, disposing the selected first and second motors in the first and second housings 11 and 12. The method further includes forming the body 20 by at least one or more of machining and casting such that the body 20 has a first periphery 21, a second periphery 22 opposite the first periphery 21 and a central region 23 interposed between the first and second peripheries 21 and 22. The first and second housings 11 and 12 are then attached to the body 20 at the first and second peripheries 21 and 22, respectively.

As mentioned above, the forming of the body 20 may include configuring the central region 23 to encase the coupling 30 for operably coupling respective torques produced by the first and second motors for output to the shaft 40. Also as mentioned above, if it is determined that one or both of the first and second motors need to be replaced, the method may further include switching at least one of the first and second motors with another motor and switching the coupling 30 in accordance with the motor switch. This can be accomplished by the corresponding one of the first and second housings 11 and 12 being detached from the body 20 so that the motor can be removed from the interior and the coupling 30 can be removed from the central region 23 of the body 20. At this point, the replacement motor can be installed into the one of the first and second housings 11 and 12 and the replacement coupling 30 can be installed in the central region 23. The replacement is completed by the one of the first and second housings 11 and 12 being re-attached to the body 20.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An adapter assembly, comprising:
   a body having a first periphery, a second periphery opposite the first periphery and a central region interposed between the first and second peripheries,
   the first periphery being attachable to a first housing at a first aperture thereof, the first housing defining an interior in which a first motor is disposable,
   the second periphery being attachable to a second housing at a second aperture thereof, the second housing defining an interior in which a second motor is disposable, and
   the central region being configured to encase a gear pump, a planetary gear-set and a coupling for operably coupling the first and second motors via the first and second apertures, respectively, for output to a shaft disposed to extend through the central region.

2. The adapter assembly according to claim 1, wherein the first and second peripheries are defined on opposite sides of the body.

3. The adapter assembly according to claim 1, wherein the central region is formed to define an oil sump fluidly communicative with the gear pump.

4. The adapter assembly according to claim 1, wherein the coupling comprises differential gearing.

5. The adapter assembly according to claim 1, wherein the shaft is plural in number and comprises:
   a first shaft in association with the first motor; and
   a second shaft in association with the second motor.

6. The adapter assembly according to claim 5, further comprising a third shaft that extends to an exterior of the adapter assembly.

7. The adapter assembly according to claim 4, wherein the shaft is plural in number and comprises:
   a first shaft in association with the first motor;
   a second shaft in association with the second motor; and
   a third shaft that extends to an exterior of the adapter assembly in association with the differential gearing.

8. The adapter assembly according to claim 1, further comprising seals to seal the first and second interiors to thereby prevent fluid leakage therefrom.

9. An adapter assembly system, comprising:
   first and second housings, each having an aperture and each being formed to define an interior in which a motor is disposable;
   a body having a first periphery, a second periphery opposite the first periphery and a central region interposed between the first and second peripheries,
   the first periphery being attachable to the first housing at the aperture thereof,
   the second periphery being attachable to the second housing at the aperture thereof, and
   the central region being configured to encase a gear pump, a planetary gear-set and a coupling for operably coupling the first and second motors via the first and second apertures, respectively, for output to a shaft disposed to extend through the central region.

10. The adapter assembly according to claim 9, wherein the first and second peripheries are defined on opposite sides of the body.

11. The adapter assembly according to claim 9, wherein the central region is formed to define an oil sump fluidly communicative with the gear pump.

12. The adapter assembly according to claim 9, wherein the coupling comprises differential gearing.

13. The adapter assembly according to claim 9, wherein the shaft is plural in number and comprises:
   a first shaft in association with the first motor; and
   a second shaft in association with the second motor.

14. The adapter assembly according to claim 13, further comprising a third shaft that extends to an exterior of the adapter assembly.

15. The adapter assembly according to claim 12, wherein the shaft is plural in number and comprises:
   a first shaft in association with the first motor;
   a second shaft in association with the second motor; and
   a third shaft that extends to an exterior of the adapter assembly in association with the differential gearing.

16. The adapter assembly according to claim 9, further comprising seals to seal the first and second interiors to thereby prevent fluid leakage therefrom.

17. A method of assembling an adapter assembly, the method comprising:
   disposing first and second motors in first and second housings;
   forming a body having a first periphery, a second periphery opposite the first periphery and a central region interposed between the first and second peripheries;
   attaching the first and second housings to the first and second peripheries, respectively; and
   configuring the central region to encase a gear pump, a planetary gear-set and a coupling for operably coupling the first and second motors for output to a shaft disposed to extend through the central region.

18. The method according to claim 17, further comprising:
   switching at least one of the first and second motors with another motor; and
   switching the coupling accordingly.

* * * * *